Jan. 3, 1950     E. H. LAND     2,493,200
VARIABLE POLARIZING COLOR FILTER
Filed May 31, 1946     2 Sheets-Sheet 1
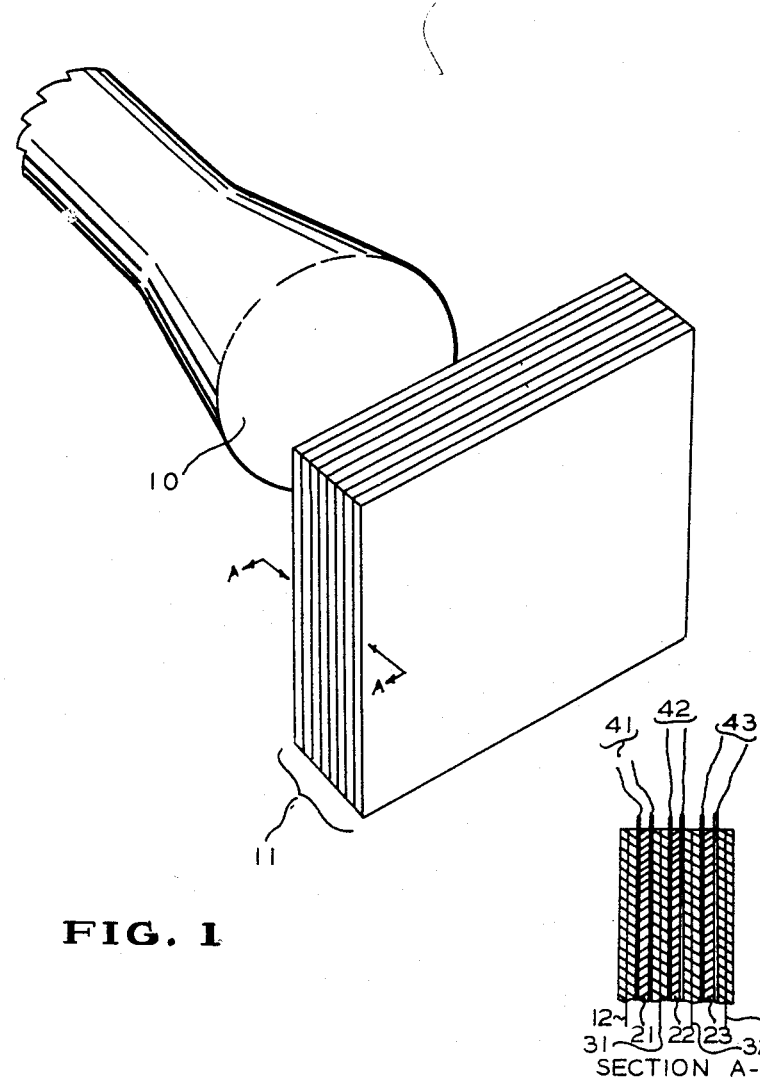

Jan. 3, 1950        E. H. LAND        2,493,200
VARIABLE POLARIZING COLOR FILTER
Filed May 31, 1946        2 Sheets-Sheet 2
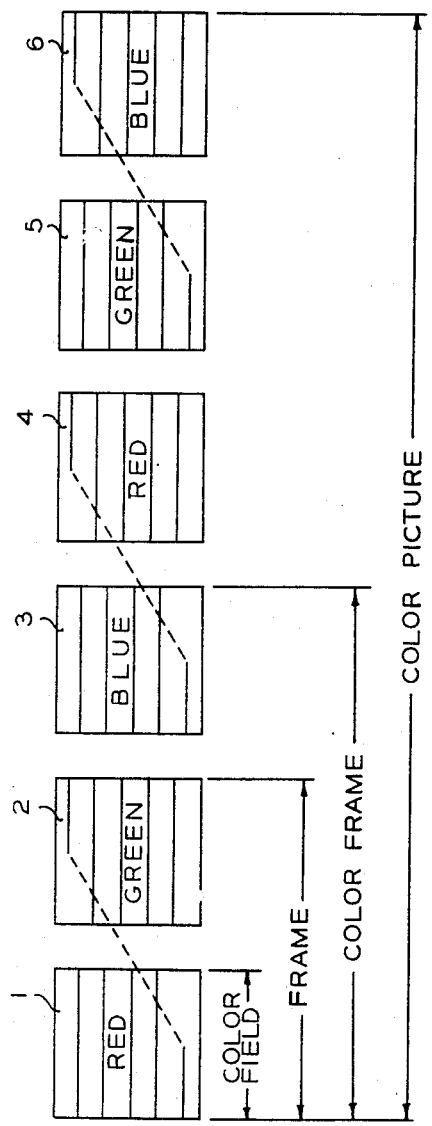
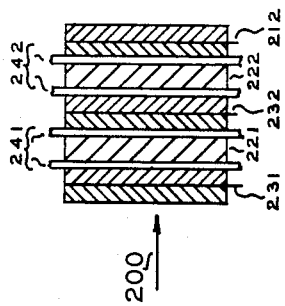
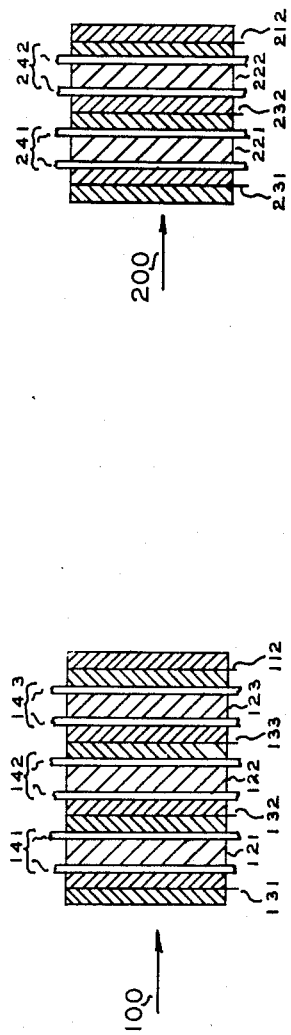
INVENTOR.
Edwin H. Land
BY
Donald C. Brown
Attorney Patented Jan. 3, 1950

2,493,200

UNITED STATES PATENT OFFICE 2,493,200

VARIABLE POLARIZING COLOR FILTER

Edwin H. Land, Cambridge, Mass., assignor to Polaroid Corporation, Cambridge, Mass., a corporation of Delaware Application May 31, 1946, Serial No. 673,405

21 Claims. (Cl. 88—112)

This invention relates to a light polarizing device, and more particularly to a method and apparatus for polarizing predetermined components of light of a predetermined wavelength band and to devices utilizing the same.

It is an object of this invention to provide a novel light polarizing and filtering device capable of instantaneously absorbing one component of light of a predetermined wavelength band or color.

Another object is to provide a novel light polarizing and filtering device in the form of layers or sheets of transparent plastic materials having the molecules thereof oriented in preferred direction and each layer having dichroic dyes of different colors incorporated in each of said oriented plastic materials.

A still further object is to provide an instantaneously operable color filter for projection of color spot and stage lights of any preselectable color.

A still further object is to provide an instantaneously operable color filter for use with synchronously operable motion pictures such that when a red frame is in the projector, the filter is red; when a green frame is in the projector, the filter is green; etc., without necessitating the use of any mechanically moving parts for the selection and positioning of the desired color in the filter for the insertion of that color screen into the path of the projected light beam.

A further object of this invention is to make possible the rapid and easy conversion of present black-and-white television apparatus and present methods of television transmission to effect the reproduction of televised pictures in natural colors.

It is a further object hereof to effect such reproductions of colored images with a minimum of difficulty in respect to color registration and color fringing.

It is a still further object to provide color television by retaining the same basic scanning frequencies and scanning methods as are now necessitated by the traditional black-and-white methods of picture reproduction.

It is also an object of this invention to provide color television reception and transmission wherein there are no moving mechanical elements.

These objects will become further clarified in the examples given in the following description, and other and similar objects will become obvious to those versed in the related art or will be suggested or appear in part hereinafter.

The invention accordingly comprises the features of construction, combination of elements, and arrangement of parts which will be exemplified in the constructions hereinafter set forth and the scope of the application of these embodiments will be indicated in the claims.

To this end the invention is particularly described herein as applied to a system of color filters and light valves through which one may view the image reproduced on the fluorescent screen of a cathode ray television receiving tube. The particular example given in considerable detail embodies a three-color process which, however, is merely illustrative and is not to be construed as limiting the scope or application of the invention in any way.

The improvements and advantages of the present invention are more readily appreciated when considered in conjunction with the appended drawings forming a part of this description and in which:

Figure 1 is a perspective view of apparatus comprising an embodiment of the present invention;

Fig. 2 is a section of the color filter-light valves array taken on the line A—A of Fig. 1; and Fig. 3 is a schematic representation of a preferred scanning technique for use with the particular apparatus illustrated in Figs. 1 and 2. Figs. 4 and 5 are still other illustrative embodiments.

Fundamentally, this invention is predicated upon the utilization of:

(1) Dichroic color filters which permit or prevent the transmission of natural or polarized light of a predetermined wavelength band less than the visible spectrum, the polarized light having its plane of polarization oriented in a predetermined manner, together with (2) Light valves which are capable of changing or not changing the polarity of the transmitted light, i. e. the plane of polarization of linearly polarized transmitted light is changed so as to be polarized at right angles to the original beam in response to external manipulation so as to condition the light whereby its passage is prevented or permitted over the span of a predetermined specific wavelengh through the dichroic color filter or filters after its passage through the respective light valve or valves.

Fig. 1 shows one application of the novel light polarizer and filter of the present invention, namely as a variable color filter and viewing device for three-color television pictures.

In this particular application, Fig. 1, the invention embraces apparatus for obtaining primary color effects in both the transmission and reception of color television images.

From this aspect, the invention contemplates the embodiment of optical projection or viewing devices for the reproduction and viewing of television pictures in color and, particularly, an apparatus wherein no moving mechanical elements are necessary.

Heretofore, a number of systems for the scanning and production of color television images has been proposed but, in general, such systems have practically duplicated the early attempts of effecting photography in color. Accordingly, the usually preferred methods have embodied scanning apparatus wherein mechanically operated devices effect the necessary scanning technique together with a definite color field sequence for the analysis of a color picture for transmission and the reception and synthesis of a corresponding color field sequence to effect the reconstruction of the desired picture in its natural colors. To this end, such systems have been two, three or four-color processes. It is now believed that a minimum of three primary colors is necessary for acceptable reproduction of images in color. The method and apparatus of this invention can be readily adapted for use with either two, three or four-color processes.

The transmission of the necessary television signals may be effected in the usual manner with the aid of a mechanically operated device or, preferably, a duplicate of the receiving optical filtering apparatus herein disclosed may be used. In either case, a color pick-up device at the transmitting station is provided with a color separator or analyzer wherein the light from the object being televised is broken down into its primary color components. Hence the scene to be televised is scanned sequentially through, for example, a set of three primary color filters and with sufficient rapidity to avoid the production of color fringes and color flicker. If necessary, the frame frequency can be effected at three times the rate required for black-and-white scanning, and thus each color component in a primary color is scanned in one-third the time of a black-and-white scanning step.

The signals are then transmitted and as received at the reproducing station, the signals corresponding to the preselected primary color components are impressed in a corresponding sequence upon the apparatus herein disclosed, in the same predetermined order as analyzed in the transmitting station and in sequence therewith.

Basically, and for the purposes of illustration, a three-color system embodying the three primary colors red, green and blue is described herein and because of the phenomenon of persistence of vision in the human eye, forms the basis of the present system. One embodiment comprises a set of dichroic subtractive filters, each having an individually associated light valve interposed between the color filter and a source of polarized light to change the polarity of the transmitted light, i. e. the plane of polarization of linearly polarized transmitted light is changed so as to be polarized at right angles to the original beam, and thus permits or prevents the passage of light of a particular wavelength through each individual filter, together with suitable electro-optic (or alternatively magneto-optic) manipulation of the light valves; this comprises one of the particular embodiments herein more specifically described. However, it is to be understood that various other modifications may be effected and no particular number of arrays of filters, light valves or polarizing devices and no particular mechanical, optical, electrical, magnetic, magneto-optical or electro-optical mode of operation of the light valves is in any sense to be deemed a limitation on the scope of this invention.

In any television system, a knowledge of scanning systems is fundamental to an understanding of picture transmission. Briefly, the scanning of an image in color may be effected in any one of three ways, using a three-color system for purposes of illustration, as follows:

(1) Each successive picture point may be scanned sequentially in three colors;

(2) Each successive picture line may be scanned sequentially in three colors; or (3) Each successive picture frame may be scanned sequentially in the three primary colors.

However, although the various other methods of scanning (i. e. point-by-point, line-by-line, etc.) are frequently amenable to variational adaptation with the system of color television presented herein, the successive scanning of each color field as shown in Fig. 3 is preferred. Under this system a modification of picture frame scanning involving interlacing—which is now almost universally practiced—is used in order to obtain the highly satisfactory results of more effective image retention on the retina, reduction of flicker, etc. The color fields are scanned successively and in the given sequence of red, green and blue at the rate of 120 color fields per second using the above three complementary colors. This results in 40 complete color frames per second, each frame comprising the above three colors; and since these frames are interlaced twice, one obtains 20 complete color pictures per second, each color such as red, green and blue being interlaced two-to-one in the odd-line method of interlaced scanning now standard practice in the United States.

In short, with the red, green, blue color fields interlaced with sequentially interposed odd-line interlaced red, green, blue color fields, then at the conclusion of the six color fields shown scanned in Fig. 3, the whole number of, say, 441 lines (as formerly used in television broadcasting) will have been scanned three complete times; and as a consequence the system will be ready to return to its original position and recommence scanning the original red field, which will then fall directly over the first field, as it should, in order to effect exact registration and perfect reproduction.

Thus the above method of reproducing color television intelligence can be easily adapted for use with the present methods of broadcasting color television signals which comprise frame-by-frame signal transmission in individual color fields in such a sequence, for example, as that shown in Fig. 3.

With this type of scanning, a workable color television system incorporating elements of this invention necessitates merely the usual single iconoscope camera tube (or a single orthicon camera tube) for transmission, a single receiving cathode ray television tube for reception, the conventional odd-line interlaced scanning technique in conjunction with a standard synchronizing system modified in a manner readily effected by those versed in the art, together with the synchronously operated light valves for effecting the operation of the appropriate color filters described below and forming the essential elements of this invention.

Referring now in more detail to the apparatus illustrated in Figs. 1 and 2, a tri-color system has been used only for the purposes of illustration; it is to be understood that the method and apparatus described can be readily modified by those skilled in the art for use with a two-color process or with a four-color process.

In such a system the image may be viewed as formed by the cathode ray oscillograph tube 10 by either projecting it on a screen or looking at it through a system or array of color filters and light valves shown collectively at 11.

Fundamentally, one possible variation and combination of elements illustrating the invention can be represented schematically as shown in Fig. 2 by the simple series of polarizer 12, light valves 21, 22 and 23 and color filters 31, 32 and 33.

In the particular embodiment shown in Fig. 2, the cathode ray oscillograph viewing device comprises an ordinary linear polarizer 12 oriented to pass vertically polarized light originating from the natural light or white light (unpolarized) appearing on the fluorescent screen of tube 10. In addition, each of the light valves 21, 22 and 23 comprises a cut and polished plate consisting of phosphate crystals (i. e. in this particular embodiment, plates of ammonium dihydrogen phosphate, also called ADP, with their particular optic axes parallel to the transmitted light ray) coated on opposite faces with a light transmitting and electrically conducting layer provided with individual leads as 41, 42 and 43 as shown, for the purpose of establishing an electric field parallel to the optic axis of the ADP crystal plate. Such crystal plates are birefringent and although originally uniaxial have a high electro-optical coefficient and display a considerable linear electro-optical effect; thus, the establishment of an electric field parallel to the optic axis causes the ADP crystal to become biaxial, and by applying approximately $9{,}000 \pm 1{,}000$ volts across the faces of the ADP crystal plate, it functions to effect a 90° rotation of the vibration direction of transmitted plane polarized light.

This particular result is somewhat analogous to that effected by a half-wave plate, namely, the rotation of the plane of polarization of plane polarized light traversing it under certain conditions.

In particular, when the plane of polarization of the incident plane polarized light bisects the right angle between the principal directions of vibration of light in the plane of the half-wave plate, the rotation of the plane of polarization of the light brought about by the action of the half-wave plate is 90°.

The color filters 31, 32 and 33 each have the property of polarizing light in one part of the spectrum only and in particular 31 is a dichroic color filter of the subtractive type known as minus red, 32 is a dichroic color filter of the subtractive type known as minus green and 33 is a dichroic color filter of the subtractive type known as minus blue.

In the color filters, the dichroic effect results in the absorption of one component (i. e. either vertically or horizontally polarized light) in a given spectrum range more strongly than the other component. Thus, in the particular embodiment above illustrated, vertically polarized light components are transmitted, the dichroic color filters all being oriented to transmit vertically polarized white light or any colored polarized light components while subtracting or removing horizontally polarized light having one particular frequency or frequency span in the visible spectrum. Briefly, the minus red filter 31 transmits vertically polarized white or red light but subtracts red from white polarized light which is changed to horizontally polarized light (i. e. rotated 90° from the vertical) by the energization of light valve 21 and subsequently transmitted through filter 31. Likewise, the minus green filter 32 and minus blue dichroic filter 33 remove the green and blue part of the spectrum respectively, when the original light as vertically polarized by polarizer 12 is rotated through 90° by the energization of light valves 22 and 23, respectively.

As originally assembled, the polarizer 12, dichroic color filters 31, 32 and 33 and the light valves 21, 22 and 23 are all oriented in parallel so as to transmit freely vertically polarized light and to absorb (or subtract) horizontally polarized light of the particular part of the spectrum, in the case of the dichroic color filters 31, 32 and 33, which the respective dye is more specifically provided to cover.

Thus, when no voltage is applied to any one of the input leads 41, 42 or 43, since all the axes are lined up in parallel, only white polarized light is transmitted by the array 11. The following table shows the results obtainable upon effecting various combinations of electric fields by energizing the respective and corresponding light valves or crystal plates; the terms "off" indicate no field and "on" indicate the establishment of a field and hence retardation or rotation effects through a 90° angle by the particular valve energized:

CHART SHOWING RESULTS FOR APPLICATION OF VOLTAGES TO VARIOUS CRYSTALS

| Example | Crystal #21 | Crystal #22 | Crystal #23 | Result |
|---|---|---|---|---|
| 1 | off | off | off | R+G+B=White. |
| 2 | off | off | on | R+G=Yellow. |
| 3 | off | on | off | Red. |
| 4 | off | on | on | R+B=Magenta. |
| 5 | on | on | on | Green. |
| 6 | on | on | off | G+B=Cyan Blue. |
| 7 | on | off | on | Blue. |
| 8 | on | off | off | Black. |

*Table I*

The derivation of the results obtained in the final column of Table I can be best explained by taking a typical example of the filter-light valve unit. Thus in Example #5 a final color of green is obtained as follows: Polarizer 12 absorbs the horizontal vibrations of unpolarized white light entirely, transmitting the plane polarized vertical vibrations; with electrodes 41 energized at approximately 10,000 volts D. C., light valve 21 rotates the plane of polarization 90°, converting the vertically polarized white light to horizontally polarized white light and hence minus red filter 31 subtracts or absorbs the red component while transmitting the green and blue components of the horizontally polarized white light; this leaves the green and blue components free to continue through light valve 22; with electrodes 42 energized light valve 22 rotates the horizontally polarized green and blue components an additional 90°, converting them to vertically polarized components which are transmitted with little if any selective absorption through minus green filter 32; with electrodes 43 energized light valve 23 rotates the incoming vertically polarized green and blue components an additional 90°, converting them to horizontally polarized components and hence minus blue filter 33 subtracts or absorbs the blue component while transmitting the green component of the again horizontally polarized light beam; this leaves the green alone in the transmitted light beam. This Example #5 illustrates the state of the filter-light valve unit during the scanning of color fields #2 and #5 of Fig. 3.

With the system incorporating vertical polarizer 12 together with the dichroic color filters 31, 32, 33 and the light valves 21, 22, 23 shown in Fig. 2, the actual sequence of operations needed to give a satisfactory three-color reproduction necessitates or entails only the sequence of operations involved in Examples #3, #5 and #7 of Table I and in that particular order, i. e. red, green and blue, respectively. Hence the sequence of scanning now commercially used and shown in Fig. 3 and the above sequences are synchronized by means of standard apparatus with the scanning sequence of the transmitting station and therefore results in the sequential energization of first (Example #3, Table I) crystal #22 for the first color field, 1 of Fig. 3 (red), then second (Example #5 of Table I) the interlineation by the energization of crystals #21, #22 and #23 simultaneously for the duration of the second color field, 2 of Fig. 3 (green) and then third (Example #7 of Table I) the energization of crystals #21 and #23 simultaneously for the duration of the third color field, 3 of Fig. 3 (blue). This sequence is followed by interlacing another red, green and blue sequence for the fourth, fifth and sixth color fields, 4, 5 and 6 of Fig. 3 respectively, to complete the color picture for scanning each picture element in three colors. In this manner, every point on the receiving screen is given a three-color reproduction utilizing color field scanning.

Briefly summarizing the above illustrative example, it may be stated for the purposes of this exposition that the viewing system herein contemplated comprises successive dichroic color filters fixed in position and character and separated by retardation plates or light valves which have optical properties capable of being practically instantaneously controlled by such means as placing them in suitable electric fields or establishing suitable electrostatic voltages on their light transmitting surfaces and thereby changing their normally zero retardation transmitting properties to a half-wave retardation, i. e. cause the valves to function as half-wave plates and rotate the plane of polarization of transmitted light through 90°.

This method of control is fundamentally known as the Kerr effect, and the particular retardation plates used herein may conveniently be called "solid Kerr cells." Such solid Kerr cells are crystals which have the property of functioning as biaxial crystals, whenever a potential is applied to two opposite faces, for a beam of light passing in the direction of the applied electric field, the latter being parallel to the optic axis. In general, the amount of retardation effected is a linear function of the impressed voltage, and if lower voltages are preferred (because of insulation difficulties, excessive heating of the crystal, etc.) then the desired amount of retardation or rotation of the transmitted beam may be effected by using such a fraction of the full voltage necessary to produce such partial retardation effects.

Furthermore, it must be understood that while a preferred embodiment of the device constitutes the provision of means permitting variations from a maximum to a minimum of the rotation or deplacement of the transmitted light vibrations and that while such means will ordinarily contemplate the use of a material as the light valve crystal plate which, when subjected to a predetermined electric field strength, exhibits electro-optic properties which enable it to function as a half-wave retardation plate, such a preferred condition is not essential to the operation of devices falling within the scope of this invention. Thus, it may, for example, be unnecessary or undesirable to have more than a relatively small amount of light transmitted by the combined filters, polarizer and intermediate crystal valve plates or, on the other hand, it may be found unnecessary completely to block transmitted light in order to produce certain favorable or pleasant lighting effects. Under these circumstances the use of electric field strengths which enable the crystal valve plates to function as wave retardation devices effecting less than half-wave retardation may prove highly satisfactory. All such modifications of the invention are to be deemed to fall within its scope.

The crystal plates are prepared by cutting, for example, the phosphate crystals perpendicularly to the optic axis of the crystal and the crystal plate surface so cut and polished is coated on its faces with an electrically conducting layer thin enough to transmit sufficient light while serving as an electrode for effecting the half-wave retardation (90° rotation) of transmitted light.

The coating process may be effected in any one of a number of ways, such as evaporation, spraying, cathode sputtering, etc. Preferably, a conducting layer is applied to the plate surface in the form of a thin layer of evaporated gold, the layer being thin enough to transmit practically all of the necessary light. For such purposes, the ordinary vacuum technique for film formation or deposition of thin metallic layers as used for coating glass, quartz or similar surfaces is readily applicable for coating the crystal plate surfaces. Still other substances which may be used in this evaporation technique are tin oxide (stannous oxide), silver, as fell as various other metallic substances capable of forming thin films which are good conductors and yet thin enough to be transparent or semi-transparent to visible light.

The Kerr cells 21, 22 and 23, Fig. 2, are all aligned or oriented for purposes of simplifying the operation and explanation in such a manner that with no potential applied to the evaporated electrodes on the faces of these cells, they transmit the incoming vertically linearly polarized light rays without rotation of the plane of polarization, while when energized they function as half-wave plates capable of rotating the plane of incident polarized light 90°. Moreover, the three dichroic color filters 31, 32, 33 are all aligned or oriented in such a manner that they have the property of transmitting vertically polarized light while removing or subtracting horizontally polarized light only in the one part of the spectrum for which they are selected to act as subtractive filters (i. e. filter 31 removing horizontally polarized red light, filter 32 removing horizontally polarized green light and filter 33 removing horizontally polarized blue light in the illustrative embodiment). Thus the composite array of filters and light valves, unit 11, Fig. 1, has the faculty of transmitting the vertically polarized light components without each particular filter subtracting its corresponding wave length or wave band (i. e. red in the minus red filter, green in the minus green filter, etc.), unless the vertically polarized light is rotated through the required 90° angle necessary for enabling the particular subsequently traversed color filter units to exercise their correspondingly associated color subtracting or color removing functions. A number of dyes have this desirable property tnd hence may be used for the particular filters; among such may be mentioned the cyan dyes for minus red (transmit blue-green), the magenta dyes for minus green, and among still others, brilliant benzo blue, Niagara Blue (2B), Solantine Red (8BL), Erie Green (MT), Erie Garnet (RB), naphthinal diazo-anisidine, etc.; see U. S. Patent No. 2,328,219 to E. H. Land for numerous other dyes and stains and further descriptions of dyed sheet material possessing high dichroism, in some cases extending over predetermined bands of wavelengths of the visible spectrum.

Thus, with the apparatus shown, there results a scanning of the image in the receiving cathode ray tube 10, Fig. 1, in such a sequential manner as to develop the received signals with the aid of the color filter-light valve unit 11 in a form representing the primary color components of the original televised scene and thereby effecting the reproduction of a complete image in a single color together with a separate sequential reproduction of the complete picture in each of the remaining colors by means of a superpositioning of each color upon one and the same screen (or retina of the observer's eye). This type of synthesis of the image in three colors together with the phenomenon of the persistence of vision in the observer gives an additive picture reproduction capable of effecting extremely accurate television picture detail in color—and this without necessitating any moving or mechanically driven apparatus.

It is obvious that the above three-color example illustrates an embodiment of the invention which is capable of being incorporated with the least possible number of changes and is adapted for use together with one of the more successful three-color systems now broadcasting color television programs on an experimental scale in the United States. Although a three-color system may be necessary for accurate color reproduction, it is submitted that a two-color system can give a pleasing picture and one which for most broadcasts will be highly acceptable. For this latter purpose red and green reproduction can be readily effected by simply using interlaced scanning incorporating Examples #3 and #5 of Table I in sequence. Similarly, four-color methods can be effected by using various other color filters and light valve combinations together with an appropriately modified type of sequential scanning.

Thus the present system is highly flexible and can be readily adapted for use with systems having an increased number of interlacings (i. e. a considerable reduction in color flicker can be obtained by using a 600, 800 or more line scanning system interlaced three or more times). Furthermore, the principles herein disclosed may be used for point-by-point and line-by-line scanning in color as well as for the above described method of color-field by color-field or frame-by-frame scanning in color. The present system is just as readily adapted for use with such 600 or 800 line systems as with the conventional 441 line black-and-white picture reproduction of some existing television systems.

In general, the apparatus of this invention can be represented schematically by a simple series of fixed filters and retardation plates. However, where the frequency and time of response is not as critical as in the case of television or similar applications necessitating high speed response, it is obvious that the generic scope of this invention may be considerably broadened by utilizing other and alternative methods of operation such as translation, sliding movements, rotation or the like, which may be deemed equivalents whether effected mechanically, electrically or magnetically. Thus, light filtering, especially retardation steps may be effected by such methods as mechanically spinning a disc, rotating a drum, fluttering or sliding a system of louvres or they might be made to produce the desired result by some mechanical-optical means such as compression, stretching or bending a retardation plate; or as described above they may be operated by utilizing magnetically or electrically operated light valves utilizing the Faraday or Kerr effect. With any of the above devices, a series of color effects in a definitely synchronized sequence is capable of being readily obtained.

As in ordinary television transmission, the sequence of colors may be synchronized in any one of a number of ways known in the art. The synchronizing signals may be used to effect correspondence either in specific lines or in a frame or sequence of frames of the optical image scanned through a particular color filter or series of color filters. These synchronizing signals may be sequentially effected in a repeated cycle with the aid of associated circuits familiar to those versed in the art. Since these circuits, when used with the apparatus herein disclosed, are practically inertialess, there is correspondingly little or no such appreciable time lag in response as is present in the case of a mechanically operated system.

In the example shown in Fig. 2, the incident light is polarized by transmission through a neutral polarizer 12 having its transmission axis vertical. However, various orientations of the transmission axis of polarizer 12 may be used, depending upon the color intensities and various other results to be effected.

It is further clear that many other colors and color combinations than those described above may be used for the purposes of this invention. Thus for use as an ordinary color filter for projection and spot light purposes, a combination including a dichroic red, brown or green dye may advantageously be used. Examples of suitable dyes for this purpose include Solantine Red (8BL), Erie Fast Brown (3RB), and a mixture of Niagara Sky Blue (6B) and Solantine Yellow FF for the green. It is to be understood that all such combinations are to be construed as within the scope of this invention.

In Fig. 4 a modification is shown wherein the incident light first falls upon a color filter 131, which is in this case a dichroic color filter of the subtractive type known as minus red; 132 is a dichroic color filter of the subtractive type known as minus green and 133 is a dichroic color filter of the subtractive type known as minus blue. The light valves 121, 122 and 123 are similar in construction and operation to those numbered 21, 22 and 23 in Fig. 2 above, while 112 represents an ordinary linear or neutral polarizer oriented to pass vertically polarized light transmitted by the array of color filters and light valves shown in Fig. 4.

It is to be understood that the linear polarizer 112 may be disposed or oriented in any other position, other than that necessary for it to pass vertically polarized light, in order to obtain various other light values and colors and that all such modifications are to be deemed as falling within the scope of the invention.

Likewise, the color filters may be variously oriented with their transmission axes at predetermined angles to the vertical and hence with their absorption axes at 90° to such positions. The same is true for the light valves; however (when energized) in order to serve as a half-wave plate capable of changing polarized light to its opposite polarity, i. e. change linearly polarized light to light polarized at right angles to the original beam, the plane of polarization of one of the components of the incident plane polarized light beam must bisect the right angle between the principal directions of vibration of light in the plane of the half-wave plate (i. e. the components of the incident beam must make an angle of 45° with the principal directions of vibration of light in the plane of the half-wave plate, which latter is the crystal plate with its electrodes energized by 9,000 ±1,000 volts).

Here again, in Fig. 4 and for purposes of simplification in explanation and description only, as originally assembled, the dichroic color filters 131, 132 and 133 and the light valves 121, 122 and 123 and neutral polarizer 112 are all oriented in parallel so as to transmit freely vertically polarized light while each dichroic color filter 131, 132 and 133 absorbs (or subtracts) horizontally polarized light of the particular part of the spectrum which the respective dye contained in the filter is more specifically provided to cover; then with all light valves 121, 122 and 123 deenergized or "off," white light is transmitted. However, since the neutral polarizer is now at the emergent end of the filter array, different portions of the spectrum left in the vertically or horizontally polarized component may be transmitted, depending on the direction of vibration of that component after its passage through terminal light valve 123. Thus, if light valve 121 alone is energized, the minus red filter 131 has subtracted or absorbed the red portion from the horizontally polarized light, while light valve 121 functioning as a half-wave plate when in its energized condition rotates or changes the horizontally polarized light to light polarized at right angles thereto (likewise the vertically polarized white light emerging from filter 121 is rotated or changed to horizontally polarized light); thus, the green and blue portions of the spectrum are transmitted vertically through the remaining elements of the filter array, including neutral polarizer 112 which transmits vertically polarized light.

The following table is a summary of the results obtainable upon effecting various combinations of electric fields by energizing the light valves or crystal plates indicated in the filter-light valve unit shown in Fig. 4:

CHART SHOWING RESULTS FOR APPLICATION OF VOLTAGES TO VARIOUS CRYSTALS

| Example | Crystal #121 | Crystal #122 | Crystal #123 | Result |
|---|---|---|---|---|
| 1 | off | off | off | R+G+B=White. |
| 2 | off | off | on | Black. |
| 3 | off | on | off | Blue. |
| 4 | off | on | on | R+G=Yellow. |
| 5 | on | on | on | Green. |
| 6 | on | on | off | R+B=Magenta. |
| 7 | on | off | on | Red. |
| 8 | on | off | off | G+B=Cyan Blue. |

*Table II*

Since for a satisfactory and pleasing color experience, a scene need be reproduced in only three colors shown successively, instead of all of the eight colors shown above, a much more simplified filter unit can be constructed in accordance with the embodiment shown in Fig. 5. In this figure, polarizing light filter element 231 is comprised of a pair of sheet-like layers in laminated form. Each of these layers represents a polarizer for a predetermined wavelength band less than the whole visible spectrum, and in addition the band polarized by one layer is different from that polarized by the other. Moreover, in the embodiment shown, the transmission axis for one layer is relatively perpendicular to that of the other layer when assembled in laminated form. For example, color filter unit 231 functions as a minus red dichroic filter for vertically polarized light and as a minus green dichroic filter for horizontally polarized light. Thus filter unit 231 is made up of laminations such that one layer has such polarizing properties that it absorbs light of a predetermined wavelength band or color (i. e. red) vibrating in a vertical direction but transmits freely all light of other wavelengths or colors as well as light of the absorbed wavelength when vibrating perpendicularly to the vertical. The other layer, having its transmission axis relatively perpendicular to that of the first mentioned layer and as thus assembled completing filter unit 231 in the particular embodiment shown in Fig. 5, has such polarizing properties that it absorbs light of a different predetermined wavelength band or color (i. e. green) from that of the minus red layer, the minus green filter subtracting green light vibrating in a horizontal direction but transmitting all light of other wavelengths or colors as well as light of the absorbed wavelength when vibrating perpendicularly to the horizontal.

Filter 232 is likewise made up of a layer which functions as a minus red dichroic filter for vertically polarized light and a second layer which functions as a minus blue dichroic filter for horizontally polarized light, the layers again having their transmission axes relatively perpendicular.

Filter 212 is a neutral polarizer and in this particular embodiment has its transmission axis disposed horizontally, thus absorbing vertically polarized light. Filter 212 comprises a polarizing layer preferably chosen for its ability to polarize uniformly substantially all visible light. Materials suitable for this purpose include such sheet polarizing films as are described in U. S. Patents 2,173,304 to E. H. Land and H. G. Rogers, 2,289,712 and 2,270,323 to E. H. Land and C. D. West, 1,918,-848 to E. H. Land, among others, sold under the trade name "Polaroid."

Although for convenience in handling and to avoid abrasion, the light polarizing materials and filter units may be made up in laminated form, comprising outer protective glass or other suitable transparent covering materials, the particular filters may be readily made up in unlaminated form, as by utilizing such materials as polyvinyl alcohol, plastics containing molecules having hydroxyl groups such, for example, as polyvinyl acetal, regenerated cellulose and the like, by orienting the molecules on each surface of the sheet in directions at right angles to each other and then dyeing one oriented surface with a dye of one color and the other oriented surface with a dye of another desired color. It is to be understood that any and all such modifications are to be construed as being within the scope of this invention and the claims.

Light valves 221 and 222 are similar in construction and operation to those described above in Figs. 2 and 3 and when energized are capable of functioning as half-wave plates. In this example, Fig. 5, valves 221 and 222 are oriented as discussed above in the description of Figs. 2 and 3 so as to be capable upon energization of changing linearly polarized light to light polarized at right angles to the original beam, namely functioning as correspondingly positioned half-wave plates, and when deenergized, allowing incident light to be transmitted without change, thus exhibiting zero retardation.

The results obtainable with the unit shown in Fig. 5 are summarized in the following table:

| Example | Crystal #221 | Crystal #222 | Result |
| --- | --- | --- | --- |
| 1 | off | off | Red. |
| 2 | on | off | Green. |
| 3 | on | on | Blue. |

*Table III*

An obvious extension of the application of this invention is to the use of circularly and elliptically polarized light. Thus, if circularly polarized light is incident upon a light valve (such as, for example, 21, Fig. 2) in unenergized condition the light is transmitted without change; however, when energized, the incident circularly polarized light is changed to circularly polarized light having a reversed rotation; thus left circularly polarized light becomes right circularly polarized and vice versa. In short, the direction of rotation is reversed by the energized light valve. It is thus obvious that a prearranged orientation of the principal axis of the light valve when functioning as a half-wave plate is not necessary when circularly polarized light is transmitted therethrough. However, to convert the linearly polarized light into circularly polarized light so as to have its polarity reversed by the unoriented energized light valve, a quarter-wave plate is used to intercept the incident light; and since the circularly polarized light is to be converted back to linearly polarized light for transmission through subsequent filters, a second quarter-wave plate is used to intercept the emergent circularly polarized light and reconvert it to linearly polarized light. Thus, a light valve transmitting such circularly polarized light is interposed between two quarter-wave plates or retardation devices with their principal axes bisecting the angle between the dichroic axes of the filters and with the principal axes of the quarter-wave plates at 90° to each other so as to neutralize the effect of each other, i. e. in the particular case above, the incident quarter-wave plate would have its principal axis oriented at 45° to the right of vertical and the emergent quarter-wave plate would have its principal axis oriented at 45° to the left of vertical.

If elliptically polarized light is to be used, then the light valve may be interposed between a pair of eighth-wave plates positioned as above or between a pair of quarter-wave plates, one positioned with its principal axis at an angle differing from 45° to the left of vertical while the other is positioned an equivalent angle to the right of vertical. Then the retardation of the incident waveplate will be that of a fractional wave-plate producing elliptically polarized light from incident plane polarized light, and after passing through the light valve 21 the second wave plate will reconvert it by transmission therethrough to plane polarized light for transmission through the subsequent color filters.

In the case of elliptically polarized transmitted light, the plane of the optic axes of the light valve in its energized state is oriented at 45° to the major axis of the ellipse.

Although the illustrative examples show a preferred type of solid Kerr cell, it is obvious that liquid cells wherein carbon disulfide, chloroform, nitrobenzene, nitrotoluene, among various other liquids can likewise be used with the dichroic color filters disclosed herein; and all such combinations are likewise to be construed as within the scope of this invention, and these whether the electric field established is parallel to or perpendicular to the transmitted light beam.

It is apparent that the device shown in Fig. 5 is applicable equally to the projection of color moving pictures. Thus, the moving pictures can be taken through a similar block or filter system such that one frame is exposed to red light, the next to green light and the next to blue light, etc. The pictures can then be developed and projected through the same or a similar color block or filter system synchronized so that when a red frame is in the projector, the block transmits red light; when a green frame is in the projector, it transmits green light, etc. The control of the color change can be effected in any one of a number of ways known in the art. Thus, the space between frames may be divided into three portions behind each of which is a photoelectric cell operated by a beam of light transmitted through a corresponding division when a red, green or blue frame is to be projected. Thus, circuits are readily established by those versed in the art for effecting the energization of the appropriate crystal in the color block shown in Fig. 5.

Various other crystalline substances besides ammonium dihydrogen phosphate (ADP) have the property of rotating a beam of plane polarized light when used in apparatus similar to that described above. Among such substances may be mentioned potassium dihydrogen phosphate (KDP) as well as rubidium dihydrogen phosphate. Moreover, various other crystalline substances such as zinc sulfide, quartz, whether dextro-rotatory or levorotatory, among numerous readily available crystalline substances demonstrating electro-optical properties, may be used, although extremely high voltages may be necessary to effect the highly desirable results described in detail above. Also, in the case of substances which are difficult to obtain in the form of large crystals or crystal plates, such as zinc sulfide, for example, the small zinc sulfide crystals can be embedded in a suitable plastic and oriented by stretching or otherwise working the plastic, as by subjecting it to electric or magnetic fields, surface polishing and the like, whereby the crystals are so aligned as to act like a large crystal and exhibit marked electro-optical effects.

As examples of further dichroic dyes which may be used to obtain subtractive filter effects, mention may be made of Methylene Blue, Methylene Green, Toluylene Red, Quinoline Yellow, Phosphine and Thioflavin T. Generally speaking, other satisfactory dyes for use in the production of color filters for the present invention may be found in the group of direct cotton dyes. These dyes may be applied directly, for example, to light polarizing sheets of polyvinyl alcohol from water solution. With the exception of a few dyes of the thiazole class, practically all of these dyes contain at least one azo group, —N=N—. The above dyes should show substantivity for the plastic which is to be treated. These substantive dyes generally comprise elongated molecules containing a system of linearly conjugated double bonds, uninterrupted at least over the greater part of the length of the molecule, or at most interrupted by an —NH— group.

Of the substantive direct cotton dyes which are preferred in the formation of the product of the present invention, dyes showing the highest dichroism are to be found, with few exceptions, in the disazo, stilbene, trisazo, monoazo, thiazole and pyrazolone groups.

Minus red dyes suitable for the formation of the cyan component, where a three-color process is employed, are Niagara Sky Blue 6B (Color Index 518), Niagara Blue NR and Niagara Sky Blue (C. I. 520).

Minus green dyes suitable for forming the magenta component, where such a process is employed, are Solantine Pink 4BL (C. I. 353), Solantine Red 8BL (C. I. 278), Geranine GL, Pontamine Fast Pink GGN (C. I. 126), Erie Pink 2B (C. I. 128) and Pontamine Fast Pink EB ex (C. I. 130).

Minus blue dyes suitable for forming the yellow component in a process of the type described are Solantine Yellow 4GL, Solantine Yellow FF (C. I. 814), Stilbene Yellow 3GA (C. I. 622), Erie Yellow Y (C. I. 365) and Erie Yellow KM (C. I. 411).

The dyes which have been listed and which have been selected from the broader group of previously defined dyes are to be understood as typical only and not as an exclusive list. It is furthermore to be understood that the dyes listed have been selected because of their suitability in one form of the invention, for example, for the preparation of subtractive three-color filters. If a two-color process is to be employed, different dyes may be used with advantage. A suitable combination for a two-color process, for example, would be Niagara Sky Blue 6B (C. I. 518) and Pontamine Diazo Orange (J-acid derivative).

The color filters are most readily prepared from any dye coupler which will convert a diazo dye base to a dye. Preferred couplers may be found in the class of phenols, naphthols, amines and substituted products thereof. Specific examples of suitable couplers for use with the dye bases mentioned are m-aminophenol, naphthionic acid, 1-naphthol-4-sulfonic acid (Nevile and Winther acid), SS acid (1-amino-8-naphthol-2,4-disulfonic acid), resorcinol and phenol. It is preferred to use for the couplers SS acid for a cyan image, resorcinol for a magenta image and phenol for a yellow image. A specific illustration of preferred dye base is Naphthinal Diazo Blue B salt, which forms a dye when a suitable coupler such as any one of those above given is used.

The term "dichroism" is used herein and in the claims as meaning the property of differential absorption of the components of an incident beam of light depending upon the vibration directions of said components.

The term "dichroic" as applied to a material or dye means a material or dye whose molecules possess the property of showing dichroism.

It is also to be understood that the expression "retardation" of a birefringent retardation plate refers to the difference of phase between the two components of plane polarized light vibrating along the mutually perpendicular principal planes of vibration of the retardation plate as they emerge from said plate, the light incident on the plate being parallel light impinging on the plate normally and being plane polarized in a direction nonparallel to either of the principal directions of vibration of said retardation plate.

The term "dichroic color filter" is used herein and in the claims as meaning filters capable of producing polarized light which exhibits a maximum dichroism over predetermined wavelength bands of the visible spectrum less than the entire visible spectrum.

In addition to the crystalline materials enumerated above, the following may also be mentioned for use in a light valve of the type described: calcium dichromate, tartaric acid, magnesium sulphate, hydrated zinc sulphate, calcium ditartrate, Rochelle salt, ammonium magnesium phosphate, barite, wulfenite (lead molybdate), sodium aluminum silicate, ammonium chloride, zinc sulfide, Boracite, among many others. A more complete table of suitable crystals may be found in the inaugural dissertation of Franz von Okolicsanyi, Nurnberg 1935, particularly pp. 11, 12, etc. thereof. The materials specifically mentioned as suitable for use in connection with the present invention for the formation of the light valves are preferably such as have a high stress optical, particularly a high electro-optical, coefficient, responding practically instantaneously to any change in an impressed field whether effected mechanically, electrically, magnetically or otherwise. The specific embodiments utilizing the various phosphate crystals are to be deemed non-limiting examples, phosphate crystals being specifically described because of the ease of growing them to suitable large sized plates and their readily being ground and polished and having conducting metallic and similar layers evaporated on their operating surfaces. It is also to be noted that various other polarizers, such as MacNielle polarizers, may be used together with the above described light valves; such combinations are to be deemed to come within the scope of this invention.

Since certain changes in carrying out the above process and certain modifications in the article which embody the invention may be made without departing from its scope, it is intended that all matter contained in the above description or shown in the accompanying drawings shall be interpreted as illustrative and not in a limiting sense.

What is claimed is:

1. An instantaneously responsive color filter necessitating no mechanical moving parts for its operation comprising a sheet of material having substantially zero retardation light-transmitting properties, said sheet being responsive to an impressed electric field to function as a fractional wave retardation device, means providing a dichroic color filter adjacent one side of said material, said color filter transmitting one component of light incident thereon without appreciable absorption thereof and having high absorption for the other component of said light throughout a relatively narrow wavelength band within the visible spectrum, means providing a substantially neutral light polarizing surface adjacent the other side of said material and means including light-transmitting electrodes for changing the impressed field to vary the color transmitted.

2. An instantaneously responsive color filter comprising in combination, a sheet of material having substantially zero retardation light-transmitting properties, said sheet being responsive to an impressed electric field of predetermined strength to function as a half-wave retardation device, means providing a dichroic color filter adjacent one side of said sheet, said color filter transmitting one component of light incident thereon without appreciable absorption thereof and having high absorption for the other component of said light throughout a relatively narrow wavelength band within the visible spectrum, means providing a substantially neutral light polarizing surface adjacent the other side of said sheet, and means including light-transmitting electrodes for changing the impressed field to vary the color transmitted.

3. A color filter comprising a sheet of material having a high electro-optical activity and adapted when subjected to an electric field of predetermined strength to function as a half-wave retardation device, means providing a dichroic color filter on one side of said sheet and a neutral light-polarizing surface on the other side of said sheet, said color filter transmitting one component of light incident thereon without appreciable absorption thereof and having high absorption for the other component of said light through a relatively narrow wavelength band within the visible spectrum, said dichroic filter and said light-polarizing surface having their respective transmission axes substantially parallel to each other, the principal directions of vibration of said sheet when functioning as a half-wave plate being substantially at 45° to the transmission axis of said polarizing surface, and means including a light-transmitting electrode on each surface of said sheet for subjecting said sheet of material to said electric field to vary the color of the light transmitted by the filter.

4. An instantaneously responsive color filter comprising three light-polarizing layers and two sheets of material having a high electro-optical activity, each sheet being adapted when subjected to an electric field to function as a fractional wave retardation device, the polarizing layers and the sheets being so positioned that each of the layers and sheets intercepts all the light acted upon and said layers and sheets alternate in the filter, two of the polarizing layers having different colored dichroic substances incorporated therein and transmitting one component of visible light without substantial absorption thereof and absorbing a high percentage of a narrow wave-length band of the other component of said light within the visible spectrum and the third polarizing layer being a substantially neutral light polarizing layer adapted to polarize substantially uniformly all visible light, all of said sheets being positioned when functioning as half-wave plates with their principal directions of vibration at angles of approximately 45° to the polarizing axes of the polarizing layers, and means for selectively subjecting the sheets to an electric field to vary the color of the light transmitted by the filter.

5. An instantaneously responsive color filter comprising three light-polarizing layers and two sheets of material having a high electro-optical activity, each sheet being adapted when subjected to an electric field of predetermined strength to function as a half-wave retardation device, the polarizing layers and the sheets being so positioned that each of the layers and sheets intercepts all the light acted upon and said layers and sheets alternate in the filter, two of the polarizing layers having different colored dichroic substances incorporated therein and transmitting one component of visible light without substantial absorption thereof and absorbing a high percentage of a narrow wave-length band of the other component of said light within the visible spectrum and the third polarizing layer being a substantially neutral light-polarizing layer adapted to polarize substantially uniformly all visible light, all of said sheets being positioned when functioning as half-wave plates with their principal directions of vibration at angles of approximately 45° to the polarizing axes of the polarizing layers, and means for selectively subjecting each of said sheets to an electric field of said predetermined strength to vary the color of the light transmitted by the filter.

6. An instantaneously responsive color filter comprising three light-polarizing layers and two sheets of material having a high electro-optical activity, each sheet being adapted when subjected to an electric field to function as a fractional wave retardation device, the polarizing layers and the sheets being so positioned that each of the layers and sheets intercepts all the light acted upon and said layers and sheets alternate in the filter, two of the polarizing layers having different colored dichroic dyes incorporated therein and transmitting one component of visible light without substantial absorption thereof and absorbing a high percentage of a narrow wave-length band of the other component of said light within the visible spectrum and the third polarizing layer being a neutral light-polarizing layer adapted to polarize substantially uniformly all visible light, all of said sheets being positioned when functioning as half-wave plates with their principal directions of vibration at angles of approximately 45° to the polarizing axes of the polarizing layers and means for selectively subjecting the sheets to said electric field to vary the color of the light transmitted by the filter.

7. An instantaneously responsive color filter comprising three light-polarizing layers and two sheets of material having a high electro-optical activity, each sheet being adapted when subjected to an electric field of predetermined strength to function as a half-wave retardation device, the polarizing layers and the sheets being so positioned that each of the layers and sheets intercepts all the light acted upon and said layers and sheets alternate in the filter, two of the polarizing layers each having a different dichloric dye incorporated therein and transmitting one component of visible light without substantial absorption thereof and absorbing a high percentage of a narrow wavelength band of the other component of said light within the visible spectrum and the third polarizing layer being a neutral light-polarizing layer adapted to polarize substantially uniformly all visible light, all of said sheets being positioned when functioning as half-wave plates with their principal directions of vibration at angles of approximately 45° to the polarizing axes of the polarizing layers and means for selectively subjecting the sheets to said electric field to vary the color of the light transmitted by the filter.

8. An instantaneously responsive color filter comprising three light-polarizing layers and two sheets of crystalline material having a high electro-optical activity, each sheet being adapted when subjected to an electric field of predetermined strength to function as a half-wave retardation device, the polarizing layers and the sheets being so positioned that each of the layers and sheets intercepts all the light acted upon and said layers and sheets alternate in the filter, two of the polarizing layers having a different dichroic substance incorporated therein and transmitting one component of visible light without substantial absorption thereof and absorbing a high percentage of a narrow wavelength band of the other component of said light within the visible spectrum and the third polarizing layer being a neutral light-polarizing layer adapted to polarize substantially uniformly all visible light, all of said sheets being positioned when functioning as half-wave plates with their principal directions of vibration at angles of approximately 45° to the polarizing axes of the polarizing layers, and means for selectively subjecting the sheets to said electric field to vary the color of the light transmitted by the filter.

9. An instantaneously responsive color filter comprising three light-polarizing layers and two sheets of material having a high electro-optical activity, each sheet being adapted when subjected to an electric field of predetermined strength to function as a half-wave retardation device, the polarizing layers and the sheets being so positioned that each of the layers and sheets intercepts all the light acted upon and said layers and sheets alternate in the filter, two of the polarizing layers having dichroic substances effective over predetermined wavelength bands in the visible spectrum incorporated therein and the third polarizing layer being a substantially neutral light-polarizing layer adapted to polarize substantially uniformly all visible light, all of said sheets being positioned when functioning as half-wave plates with their principal directions of vibration at angles of approximately 45° to the polarizing axes of the polarizing layers, and means for selectively subjecting the sheets to said electric field to vary the color of the light transmitted by the filter.

10. An instantaneously responsive color filter comprising three light-polarizing layers and two sheets of material having a high electro-optical activity, each sheet being adapted when subjected to an electric field to function as a fractional wave retardation device, the polarizing layers and the sheets being so positioned that each of the layers and sheets intercepts all the light acted upon and said layers and sheets alternate in the filter, two of the polarizing layers having different dichroic dyes effective over predetermined wavelengths bands in the visible spectrum incorporated therein and the third polarizing layer being a substantially neutral light-polarizing layer adapted to polarize substantially uniformly all visible light, all of said sheets being positioned when functioning as half-wave plates with their principal directions of vibration at angles of approximately 45° to the polarizing axes of the polarizing layers and means for selectively subjecting the sheets to said electric field to vary the color of the light transmitted by the filter.

11. An instantaneously responsive color filter comprising a light-transmitting material adapted when subjected to an impressed stress of predetermined magnitude to function as a half-wave retardation device, means on one side of said material providing two polarizing surfaces in the form of a layer of plastic having at least its surface molecules substantially oriented, the direction of molecular orientation of one of said surfaces being substantially at right angles to that of the other surface, each of said surfaces having a different dichroic substance incorporated therein, each of said substances absorbing light of a predetermined wavelength band of the visible spectrum less than the entire visible spectrum, means on the other side of said material providing a third light polarizing element adapted to polarize substantially uniformly all visible light, said third polarizing element being positioned with its transmission axis in parallel relation with that of one of said first-named polarizing surfaces and means for subjecting the material to stress of said predetermined magnitude to vary the color of the light transmitted by the filter.

12. An instantaneously responsive color filter comprising a light-transmitting material adapted when subjected to an impressed stress of predetermined magnitude to function as a half-wave retardation device, means on one side of said material providing two polarizing surfaces in the form of a layer of plastic having at least its surface molecules substantially oriented, the direction of molecular orientation of one of said surfaces being substantially at right angles to that of the other surface, one of the surfaces having a red dichroic substance incorporated therein and the other of said surfaces having a blue dichroic substance incorporated therein, means on the other side of said material providing a third light polarizing element adapted to polarize substantially uniformly all visible light, said third polarizing element being positioned with its transmission axis in parallel relation with that of one of said first named polarizing surfaces and means for subjecting the material to stress of said predetermined magnitude to vary the color of the light transmitted by the filter.

13. An instantaneously responsive color filter comprising a light-transmitting material adapted when subjected to an impressed stress of predetermined magnitude to function as a half-wave retardation device, means on one side of said material providing two polarizing surfaces in the form of a layer of plastic having at least its surface molecules substantially oriented, the direction of molecular orientation of one of said surfaces being substantially at right angles to that of the other surface, each of said surfaces having a different dichroic dye incorporated therein, each of said dyes absorbing light of a predetermined wavelength band of the visible spectrum less than the entire visible spectrum, means on the other side of said material providing a third light-polarizing element adapted to polarize substantially uniformly all visible light, said third polarizing element being positioned with its transmission axis in parallel relation with that of one of said first-named polarizing surfaces and means for subjecting the material to stress of said predetermined magnitude to vary the color of the light transmitted by the filter.

14. An instantaneously responsive color filter comprising a light-transmitting material adapted when subjected to an impressed stress of predetermined magnitude to function as a half-wave retardation device, means on one side of said material providing two polarizing surfaces in the form of a layer of plastic having at least its surface molecules substantially oriented, the direction of molecular orientation of one of said surfaces being substantially at right angles to that of the other surface, one of the surfaces having a red dichroic dye incorporated therein and the other of said surfaces having a blue dichroic dye incorporated therein, means on the other side of said material providing a third light-polarizing element adapted to polarize substantially uniformly all visible light, said third polarizing element being positioned with its transmission axis in parallel relation with that of one of said first-named polarizing surfaces and means for subjecting the material to stress of such predetermined magnitude to vary the color of the light transmitted by the filter.

15. An instantaneously responsive color filter comprising a plurality of sheet-like polarizing elements, each of said elements having a different dichroic substance incorporated therein for absorbing one component of light of a predetermined wavelength band of the visible spectrum less than the entire visible spectrum and transmitting the component vibrating at right angles to said first-named component, an additional light-polarizing element adapted to polarize substantially uniformly all visible light, wave retardation devices potentially capable of functioning as fractional wave plates so positioned that polarizing elements and retardation devices alternate in said filter and all of said elements and devices intercept all of the light acted on by said filter, said wave plates having high electro-optical coefficients and adapted when subjected to an electric field to function as fractional wave plates, and means responsive upon energization for rendering the retardation devices selectively operable as such wave plates to vary the color of the light transmitted by the filter.

16. An instantaneously responsive color filter comprising a plurality of sheet-like polarizing elements, each of said elements having a different dichroic substance incorporated therein for absorbing one component of light of a predetermined wavelength band of the visible spectrum less than the entire visible spectrum and transmitting the component vibrating at right angles to said first-named component, an additional light-polarizing element adapted to polarize substantially uniformly all visible light, wave retardation devices potentially capable of functioning as fractional wave plates so positioned that polarizing elements and retardation devices alternate in said filter and all of said elements and devices intercept all of the light acted on by said filter, and means responsive upon energization for rendering the retardation devices selectively operable to function as fractional wave plates to vary the color of the light transmitted by the filter.

17. An instantaneously responsive color filter comprising a plurality of light-transmitting elements positioned to intercept the same incident beam of light and assembled to form a unitary structure, said elements comprising three sheet-like dichroic color filters, a sheet-like neutral light polarizing surface and three sheets of light-transmitting material, each said sheet of light-transmitting material having a high electro-optical activity and adapted when subjected to an electric field of predetermined strength to function as a half-wave retardation device, all of said elements being so positioned that the polarizing elements and sheets of material capable of becoming retardation devices alternate in said filter, the polarizing elements having their polarizing axes substantially aligned, the principal directions of vibration of each of said retardation devices being substantially at angles of approximately 45° to the polarizing axes of said polarizing elements, one of said dichroic filters having a minus red dichroic substance incorporated therein, another of said dichroic filters having a minus green dichroic substance incorporated therein, and a third of said dichroic filters having a minus blue dichroic substance incorporated therein.

18. An instantaneously responsive color filter comprising a plurality of light-transmitting elements positioned to intercept the same incident beam of light and assembled to form a unitary structure, said elements comprising three sheet-like dichroic color filters, a sheet-like neutral light-polarizing surface and three sheets of light-transmitting material, each said sheet of light-transmitting material having a high electro-optical activity and adapted when subjected to an electric field of predetermined strength to function as a half-wave retardation device, all of said elements being so positioned that the polarizing elements and sheets of material capable of becoming retardation devices alternate in said filter, the polarizing elements having their polarizing axes substantially aligned, the principal directions of vibration of each of said retardation devices being substantially at angles of approximately 45° to the polarizing axes of said polarizing elements, one of said dichroic filters having a minus red dichroic substance incorporated therein, another of said dichroic filters having a minus green dichroic substance incorporated therein, and a third of said dichroic filters having a minus blue dichroic substance incorporated therein, and means for selectively controlling the electric field for each sheet to vary the color transmitted.

19. An instantaneously responsive color filter necessitating no mechanical moving parts for its operation comprising a plurality of sheet-like dichroic color filters, a plurality of potential half-wave retardation devices so positioned that all dichroic color filters and retardation devices intercept all light acted on by said filter and alternate in said filter with the principal vibration directions of said retardation devices, when energized, at predetermined acute angles to the polarizing axes of the filters, each of said dichroic filters being adapted to absorb different wavelength bands of visible light and at least one being capable of absorbing one component of transmitted light substantially uniformly throughout the visible range of the spectrum, and means for selectively energizing predetermined retardation devices to vary the color of light transmitted by the filter.

20. An instantaneously responsive color filter comprising a light-transmitting material adapted when subjected to an impressed field to function as a fractional wave retardation device, a light-transmitting conducting layer positioned adjacent each side of said material for applying the impressed field, means providing a dichroic color filter positioned adjacent the external side of one of said layers, said color filter transmitting one component of light incident thereon without appreciable absorption thereof and having high absorption for the other component of said light throughout a relatively narrow wavelength band within the visible spectrum, means positioned adjacent the external side of the other of said layers providing a neutral light-polarizing layer adapted to polarize substantially uniformly all visible light and means for controlling the magnitude of the impressed field to vary the color of the light transmitted by the filter.

21. An instantaneously responsive color filter comprising a light-transmitting material adapted when subjected to an impressed field of predetermined magnitude to function as a half-wave retardation device, a light-transmitting conducting layer positioned adjacent each side of said material for applying the impressed field, means providing a dichroic color filter positioned adjacent the external side of one of said layers, said color filter transmitting one component of light incident thereon without appreciable absorption thereof and having high absorption for the other component of said light throughout a relatively narrow wavelength band within the visible spectrum, means positioned adjacent the external side of the other of said layers providing a neutral light-polarizing layer adapted to polarize substantially uniformly all visible light and means for subjecting the material to the impressed field of said predetermined magnitude to vary the color of the light transmitted by the filter.

EDWIN H. LAND.

REFERENCES CITED

The following references are of record in the file of this patent:

UNITED STATES PATENTS

| Number | Name | Date |
| --- | --- | --- |
| 2,010,307 | Leishman | Aug. 6, 1935 |
| 2,109,540 | Leishman | Mar. 1, 1938 |
| 2,118,160 | Cawley | May 24, 1938 |
| 2,184,999 | Land | Dec. 26, 1939 |
| 2,263,684 | Ryan | Nov. 25, 1941 |
| 2,298,059 | Land | Oct. 6, 1942 |
| 2,350,892 | Hewson | June 6, 1944 |